3,244,691
METAL COMPLEX MONOAZO DYESTUFFS
Ugo Moiso and Sisto Sergio Papa, Milan, Italy, assignors to Aziende Colori Nazionali Affini (A.C.N.A.), S.p.A., Milan, Italy
No Drawing. Filed Feb. 5, 1963, Ser. No. 256,235
Claims priority, application Italy, Feb. 9, 1962, 2,609/62
3 Claims. (Cl. 260—151)

The present invention relates to novel metal complex dyestuffs and to a process for obtaining such dyestuffs.

More particularly, the present invention relates to a process carried out under anhydrous conditions whereby metal complex dyestuffs are obtained. These dyestuffs are particularly valuable for neutral dyeing of natural or synthetic polyamide fibers. Such dyestuffs are obtained starting from a monoazo dyestuff.

The metal complex dyestuffs of the present invention derive from a monoazo compound of the general Formula 1:

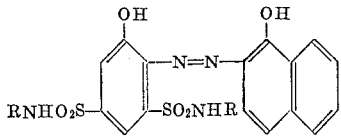

wherein R is an alkyl radical having 1 to 4 C atoms, such as methyl, ethyl, isopropyl, propyl, butyl, isobutyl. The chromate dyestuff derived from a monoazo compound of the formula

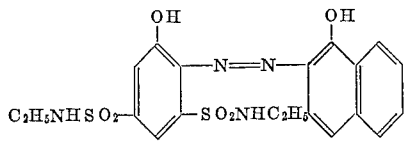

is particularly suitable, due to its dyeing characteristics and the fastness of the dyeings obtained.

According to the process of the present invention, the monoazo dyestuff, which previously has been dried, is treated under anhydrous conditions with the metalizing agent and a mixture of organic compounds, comprising from 30 to 130% of ethylene glycol (or ethers of ethylene glycol), formamide or dimethylformamide and from 0 to 100 parts of urea, in the molten state. The preferred ratios are 100 parts urea per 30 parts of one or more of the other substances.

As metallizing agents, simple chromium or cobalt salts are used, e.g., acetates, sulphates, chlorides, etc. The amount of metal salt used is generally stoichiometric, in order to form 1:2 complexes; that is 0.5 g. atoms of metal per mole of the monoazoic compound. The temperature of the metallization reaction is maintained at from about 110 to 140° C.; the duration for completing the metallization reaction is short, generally from about 30 to 100 minutes.

At the end of the metallization, the molten mass is poured in water or is diluted with water, eventually with the addition of alkalies (NaOH, Na₂CO₃, etc.), and the finished dyestuff is separated by conventional methods.

The process of the present invention offers a number of advantages as compared to known metallization methods carried out in the aqueous phase, i.e.:

(a) High reaction rate. The metallization reaction in aqueous media requires from 5 to 8 hours, whereas working in anhydrous media according to the present invention a complete metallization up to an extent of 100% is obtained within a period of 15 up to 100 minutes.

(b) Production potential. A 1.2 liter reactor is required for producing one kg. of dyestuff having a commercial concentration of 100%, whereas working according to the known art a reactor is needed having a capacity higher than six liters in order to obtain the same results.

(c) Dyestuffs obtained in anhydrous phase have, as compared to those obtained in aqueous medium, a higher concentration (about double), a higher purity and an improved solubility.

The metal complex dyestuffs of the present invention are valuable for dyeing polyamides. The dyeing of polyamide materials is carried out in an aqueous bath containing the metal complex dyestuff derived from a monoazoic compound comprised in the general Formula 1 together with compounds able to maintain a neutral or slightly acid pH, such as ammonium acetate, ammonium sulphate or small amounts of acetic acid.

The polyamide material is immersed in the dyeing bath at about 50° to 60° C., then gradually raising the temperature up to the boiling temperature. Appropriate additives may be added as desired, to obtain a more uniform dyeing such as condensation products of aliphatic amides or amines with ethylene oxide.

The following example will further illustrate the invention.

Example 32.3 g. of 3,5-bis-(N-ethylsulfamido)-2-aminophenol are dissolved in 200 ml. of H₂O and 15 ml. NaOH (36° Bé.). Said solution is indirectly diazotized at 0-5° C. by pouring the solution of its sodium salt added with 6.9 g. NaNO₂ on 30 ml. of hydrochloric acid (20° Bé.) and 200 ml. of H₂O+ice. The temperature is maintained at 0-5° C. by addition of ice. The volume at the end of the diazotation is 600 ml.

The solution is neutralized to Congo red with a Na₂CO₃ 10% (vol.) solution. The neutralized solution is poured on a solution of 15.1 g. alpha-naphthol in 300 ml. water and 15 ml. 36° Bé. NaOH, at 0-5° C.

At the end of the coupling, the monoazo dyestuff is separated by salting or light acidification, filtered, and purified, if necessary, by removing the small amounts of p-coupled product, and dried at 70-80° C.

In order to remove the p-coupled product, the monoazo paste is dissolved in 500 ml. acetone, and afterwards is acidified with 30-35 ml. of HCl 5 N—subsequentlly shaken for 15 minutes, filtered and washed with 20-25 ml. of acetone. The red product is dried at 80° C.

The dried monoazo compound is heated to 100° C. with a mixture consisting of 100 g. urea, 30 g. ethylene glycol and 0.05 gram mole chromium acetate. Then the mixture is heated up to 125-128° C. and is kept at this temperature for 2 hours in order to complete the metallization.

The mixture is poured in water, salted to 5%, filtered and dried at 70-80° C.

A blue-black powder is obtained, which dyes wool in a neutral or weak acid bath in a pure blue shade, the resultant dye having a good uniformity and fastness to wet treatments and light, and being markedly superior to that obtained using a dyestuff prepared in aqueous media.

A dyebath is prepared with:

10-15% of sodium sulfate crystals
3-5% of ammonium acetate
1-2% of 30% acetic acid and the required dyestuff amount. The material is introduced at 30° C., the dyebath is heated to the boiling point within 30-40 minutes and the dyeing operation is continued for further 30-45 minutes.

Variations can of course be made without departing from the spirit of the invention.

Having thus described the invention, what it is desired to secure and claim by Letters Patent is:

1. A metal complex dyestuff which contains one atom of a metal selected from the group consisting of chromium and cobalt bound in complex union to two molecules of a compound of the formula

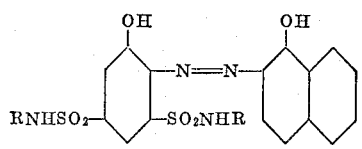

wherein R is an alkyl group having from 1 to 4 carbon atoms.

2. The complex of claim 1 wherein the metal is chromium.

3. The complex of claim 2 wherein R is ethyl.

References Cited by the Examiner

UNITED STATES PATENTS

| | | | |
|---|---|---|---|
| 2,813,853 | 11/1957 | Steinemann | 260—151 X |
| 2,891,938 | 6/1959 | Schetty | 260—151 X |
| 2,933,489 | 4/1960 | Biedermann | 260—151 X |
| 2,991,280 | 7/1961 | Schetty et al. | 260—151 X |
| 3,086,004 | 4/1963 | Gross et al. | 260—151 |
| 3,126,368 | 3/1964 | Bossard et al. | 260—151 |
| 3,131,989 | 5/1964 | Buehler et al. | 8—43 |
| 3,157,458 | 11/1964 | Dawson et al. | 8—43 |

FOREIGN PATENTS 882,531   11/1961   Great Britain.

CHARLES B. PARKER, *Primary Examiner.*